US00RE48749E

(19) United States
(12) Reissued Patent
Wang et al.

(10) Patent Number: US RE48,749 E
(45) Date of Reissued Patent: Sep. 21, 2021

(54) DATA PROCESSING METHOD AND TERMINAL DEVICE

(71) Applicant: Honor Device Co., Ltd., Shenzhen (CN)

(72) Inventors: Yali Wang, Beijing (CN); Min Zhang, Shenzhen (CN); Xuesong Yu, Beijing (CN); Xiaomei Yang, Shenzhen (CN)

(73) Assignee: HONOR DEVICE CO., LTD., Shenzhen (CN)

(21) Appl. No.: 16/918,818

(22) Filed: Jul. 1, 2020

Related U.S. Patent Documents

Reissue of:
(64) Patent No.: 10,015,306
Issued: Jul. 3, 2018
Appl. No.: 15/505,149
PCT Filed: Aug. 20, 2014
PCT No.: PCT/CN2014/084831
§ 371 (c)(1),
(2) Date: Feb. 20, 2017
PCT Pub. No.: WO2016/026106
PCT Pub. Date: Feb. 25, 2016

(51) Int. Cl.
*H04M 1/725* (2021.01)
*H04M 1/72463* (2021.01)
*H04W 4/48* (2018.01)
*H04W 4/80* (2018.01)
*H04W 4/40* (2018.01)
(Continued)

(52) U.S. Cl.
CPC ..... *H04M 1/72463* (2021.01); *H04L 67/306* (2013.01); *H04M 1/725* (2013.01); *H04M 1/72412* (2021.01); *H04W 4/027* (2013.01); *H04W 4/40* (2018.02); *H04W 4/48* (2018.02);
(Continued)

(58) Field of Classification Search
CPC ..... H04M 1/72577; H04M 1/7253; H04W 4/008; H04W 4/046; H04W 76/02
See application file for complete search history.

(56) References Cited

U.S. PATENT DOCUMENTS 9,710,134 B1 * 7/2017 Russell ..... G06F 3/0482
2007/0026850 A1 2/2007 Keohane et al. . H04M 1/72577 455/418
(Continued)

FOREIGN PATENT DOCUMENTS

CN 102957800 A 3/2013
CN 103634479 A 3/2014
CN 103716457 A 4/2014

OTHER PUBLICATIONS

Machine Translation and Abstract of Chinese Publication No. CN103634479, Mar. 12, 2014, 7 pages.
(Continued)

*Primary Examiner* — Minh Dieu Nguyen
(74) *Attorney, Agent, or Firm* — Conley Rose, P.C.

(57) ABSTRACT

A data processing method and a terminal device, where the method includes obtaining a speed of the terminal device, receiving a first communications service, disabling a preset reminder of the first communications service when the speed of the terminal device exceeds a first preset value, and enabling the preset reminder of the first communications service when the speed of the terminal device decreases to a second preset value, where the second preset value is less than or equal to the first preset value. The data processing method and the terminal device are used for a user reminder of a terminal device in a vehicle mode.

20 Claims, 7 Drawing Sheets

(51) Int. Cl.

| | |
|---|---|
| ***H04W 76/10*** | (2018.01) |
| ***H04M 1/72412*** | (2021.01) |
| ***H04L 29/08*** | (2006.01) |
| ***H04W 4/02*** | (2018.01) |
| *H04W 84/18* | (2009.01) |

(52) U.S. Cl.
CPC ..... *H04W 4/80* (2018.02); *H04W 76/10* (2018.02); *H04W 84/18* (2013.01)

(56) References Cited

U.S. PATENT DOCUMENTS

2009/0221279 A1* 9/2009 Rutledge ..... H04M 1/72577 455/418
2009/0295562 A1* 12/2009 Shuster ..... H04W 4/027 340/506
2010/0201478 A1* 8/2010 Veen ..... G06F 21/36 340/3.1
2012/0052907 A1* 3/2012 Gilbreath ..... H04W 4/48 455/556.1
2012/0252420 A1 10/2012 Czaja et al. ..... H04W 48/04 455/414.1
2013/0090103 A1* 4/2013 Kim ..... H04M 1/72577 455/418
2015/0139058 A1 5/2015 Xia ..... G06K 9/6202 370/311
2015/0304928 A1* 10/2015 Lu ..... H04W 36/32 455/437

OTHER PUBLICATIONS

Foreign Communication From a Counterpart Application, PCT Application No. PCT/CN2014/084831, English Translation of International Search Report dated Dec. 31, 2014, 2 pages.
Foreign Communication From a Counterpart Application, PCT Application No. PCT/CN2014/084831, English Translation of Written Opinion dated Dec. 31, 2014, 6 pages.

* cited by examiner

DATA PROCESSING METHOD AND TERMINAL DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *a Reissue Application of U.S. Pat. No. 10,015,306 issued on Jul. 3, 2018, which is* a U.S. National Stage of International Patent Application No. PCT/CN2014/084831 filed on Aug. 20, 2014[, which is hereby incorporated by reference in its entirety]. *The aforementioned patent applications are hereby incorporated by reference in their entireties.*

TECHNICAL FIELD

The present disclosure relates to the electronics field, and in particular, to a data processing method and a terminal device.

BACKGROUND

With popularization of family automobiles, a vehicle mode (a driving mode) is correspondingly added to original modes, such as a conference mode and an outdoor mode, of a mobile phone, where the vehicle mode is a mode used in a mobile phone during vehicle driving.

In some other approaches, when a mobile phone enters a vehicle mode, BLUETOOTH of the mobile phone and BLUETOOTH of a vehicle communicate with each other, the mobile phone obtains communications services, and the BLUETOOTH push information may indicate an incoming call, an short message service (SMS) message, a multimedia message, push information of an application, and the like. A ringtone, a vibration, and a screen display are correspondingly generated according to these communications services in order to remind a user of an incoming call, an SMS message, an unread message, or the like. However, when a vehicle is moving and a user who drives the vehicle hears or sees a reminder of a terminal device, driving by the user is affected, and it is likely to present a threat to traffic safety. Likewise, besides vehicle driving, a similar problem also occurs in other scenarios such as yacht driving and sports.

SUMMARY

Embodiments of the present disclosure provide a data processing method and a terminal device, which can prevent a user from being disturbed by the terminal device.

To achieve the foregoing objective, the following technical solutions are adopted in the embodiments of the present disclosure.

A first aspect provides a data processing method, applied to a terminal device, including obtaining a speed of the terminal device, receiving a first communications service, disabling a preset reminder of the first communications service if the speed of the terminal device exceeds a first preset value, or enabling the preset reminder of the first communications service if the speed of the terminal device decreases to a second preset value, where the second preset value is less than or equal to the first preset value.

With reference to the first aspect, in a first implementable manner, before enabling the preset reminder of the first communications service if the speed of the terminal device decreases to a second preset value, the method further includes recording the first communications service, and enabling the preset reminder of the first communications service if the speed of the terminal device decreases to a second preset value includes obtaining the recorded first communications service, and enabling the corresponding preset reminder according to the recorded first communications service.

With reference to the first implementable manner, in a second implementable manner, after enabling the preset reminder of the first communications service if the speed of the terminal device decreases to a second preset value, the method further includes deleting the first communications service.

With reference to the first aspect and the first to the second implementable manners, in a third implementable manner, before obtaining a speed of the terminal device, the method further includes controlling the terminal device to establish a communication connection to a vehicle, and obtaining a speed of the terminal device includes obtaining the speed of the terminal device by obtaining a vehicle speed of the vehicle.

With reference to the third implementable manner, in a fourth implementable manner, the vehicle has in-vehicle BLUETOOTH, the terminal device also has BLUETOOTH, and after the in-vehicle BLUETOOTH of the vehicle is successfully paired with the BLUETOOTH of the terminal device, controlling the terminal device to establish a communication connection to a vehicle includes controlling the terminal device and the vehicle to establish the communication connection using the successfully paired BLUETOOTH.

With reference to the first aspect and the first to the fourth implementable manners, in a fifth implementable manner, the first communications service belongs to a preset communications service, where the preset communications service is preset according to a choice of a user, or set by the terminal device by default.

A second aspect provides a terminal device, including an obtaining unit configured to obtain a speed of the terminal device, a receiving unit configured to receive a first communications service, a disabling unit configured to disable a preset reminder of the first communications service received by the receiving unit if the speed of the terminal device obtained by the obtaining unit exceeds a first preset value, and an enabling unit configured to enable the preset reminder of the first communications service received by the receiving unit if the speed of the terminal device obtained by the obtaining unit decreases to a second preset value, where the second preset value is less than or equal to the first preset value.

With reference to the second aspect, in a first implementable manner, the terminal device further includes a recording unit configured to record the first communications service, and the enabling unit is further configured to obtain the recorded first communications service, and enable the corresponding preset reminder according to the recorded first communications service.

With reference to the first implementable manner, in a second implementable manner, the terminal device further includes a deletion unit configured to delete the first communications service.

With reference to the second aspect and the first to the second implementable manners, in a third implementable manner, the terminal device further includes a connection unit configured to control the terminal device to establish a communication connection to a vehicle, and the obtaining unit is further configured to obtain the speed of the terminal device by obtaining a vehicle speed of the vehicle.

With reference to the third implementable manner, in a fourth implementable manner, the vehicle has in-vehicle BLUETOOTH, the terminal device also has BLUETOOTH, and after the in-vehicle BLUETOOTH of the vehicle is successfully paired with the BLUETOOTH of the terminal device, the connection unit is further configured to control the terminal device and the vehicle to establish a communication connection using the successfully paired BLUETOOTH.

With reference to the second aspect and the first to the fourth implementable manners, in a fifth implementable manner, the first communications service belongs to a preset communications service, where the preset communications service is preset according to a choice of a user, or set by the terminal device by default.

A third aspect provides a terminal device, including a transceiver configured to communicate with an external communications device, a memory configured to store program code, and a processor coupled with the memory, where the processor is configured to invoke the program code stored in the memory to perform the steps of obtaining a speed of the terminal device, receiving a first communications service, disabling a preset reminder of the first communications service if the speed of the terminal device exceeds a first preset value, or enabling the preset reminder of the first communications service if the speed of the terminal device decreases to a second preset value, where the second preset value is less than or equal to the first preset value.

With reference to the third aspect, in a first implementable manner, the processor is further configured to perform the step of recording the first communications service, and enabling the preset reminder of the first communications service if the speed of the terminal device decreases to a second preset value includes obtaining the recorded first communications service, and enabling the corresponding preset reminder according to the recorded first communications service.

With reference to the first implementable manner, in a second implementable manner, the processor is further configured to perform the step of deleting the first communications service.

With reference to the third aspect and the first to the second implementable manners, in a third implementable manner, the processor is further configured to perform the steps of controlling the terminal device to establish a communication connection to a vehicle, and obtaining the speed of the terminal device by obtaining a vehicle speed of the vehicle.

With reference to the third implementable manner, in a fourth implementable manner, the terminal device further includes a BLUETOOTH module configured to communicate with a BLUETOOTH communication device, and the vehicle has in-vehicle BLUETOOTH, the terminal device also has BLUETOOTH, and after the in-vehicle BLUETOOTH of the vehicle is successfully paired with the BLUETOOTH of the terminal device, controlling the terminal device to establish a communication connection to a vehicle includes controlling the terminal device and the vehicle to establish the communication connection using the successfully paired BLUETOOTH.

With reference to the third aspect and the first to the fourth implementable manners, in a fifth implementable manner, the first communications service belongs to a preset communications service, where the preset communications service is preset according to a choice of a user, or set by the terminal device by default.

In this case, when a speed of a terminal device exceeds a first preset value, a preset reminder of a first communications service is disabled, that is, the preset reminder of the first communications service is delayed. The preset reminder of the first communications service is not enabled until the speed of the terminal device decreases to a second preset value. Therefore, when the speed of the terminal device is the first preset value, a user is prevented from being disturbed by the first communications service received by the terminal device.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
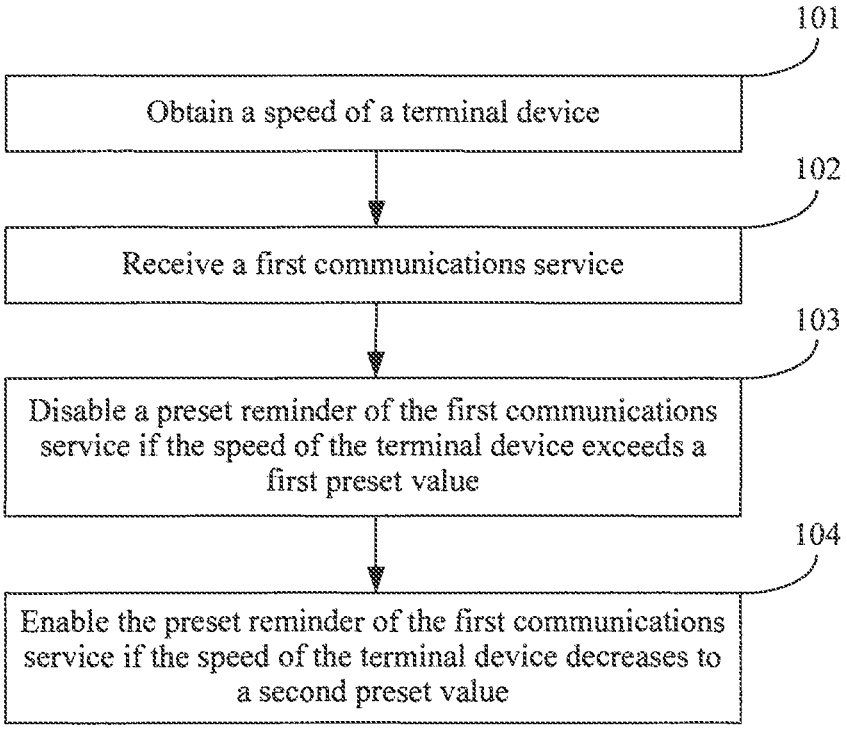
FIG. 1 is a flowchart of a data processing method according to an embodiment of the present disclosure.

This embodiment of the present disclosure provides a data processing method that is applied to a terminal device. As shown in FIG. 1, the method may include the following steps.

Step 101: Obtain a speed of the terminal device.

Step 102: Receive a first communications service.

The first communications service may include an incoming call, an SMS message, a multimedia message, and push information of an application, for example, a sales promotion advertisement from a TAOBAO client and chat information from a WECHAT client.

Step 103: Disable a preset reminder of the first communications service if the speed of the terminal device exceeds a first preset value,.

This preset reminder is preferably a preset sound reminder, such as an incoming-call ringtone, an SMS message alert tone, and a multimedia message alert tone. The sound is likely to disturb a user. Therefore, the sound is disabled. Certainly, another reminder likely to disturb the user, such as a vibration, also falls within a scope of this preset reminder.

Step 104: Enable the preset reminder of the first communications service if the speed of the terminal device decreases to a second preset value, where the second preset value is less than or equal to the first preset value.

After the terminal receives the first communications service and disables the preset reminder, if the speed decreases to the second preset value, the terminal enables the preset reminder, preferably the sound reminder such as an incoming-call ringtone, an SMS message alert tone, and an SMS message alert tone, to remind the user that the terminal receives the communications service. Alternatively, a vibration reminder is enabled.

In this case, when a speed of a terminal device exceeds a first preset value, a preset reminder of a first communications service is disabled, that is, the preset reminder of the first communications service is delayed. The preset reminder of the first communications service is not enabled until the speed of the terminal device decreases to a second preset value. Therefore, when the speed of the terminal device is the first preset value, a user is prevented from being disturbed by the first communications service received by the terminal device.

It should be noted that in step 102 of this embodiment of the present disclosure, the terminal device locally and actually receives the communications service. For example, according to an existing operation mode, if the terminal device receives an SMS message, there is a sign for receiving an SMS message, such as a received SMS message shown on an SMS message icon on a screen of the terminal device. However, according to this embodiment of the present disclosure, if the speed exceeds a value, the reminder is disabled, especially a reminder of a sound, a vibration, or the like that interferes with the user. However, this embodiment of the present disclosure further puts forward that when the speed of the terminal device decreases to a value, the terminal enables the delayed reminder to remind the user that the terminal device receives the communications service that needs to be examined in a timely manner.

Before step 104, the method may further include obtaining the recorded first communications service. Step 104 may further include obtaining the recorded first communications service, and enabling the corresponding preset reminder according to the recorded first communications service. After step 104, the method may further include deleting the first communications service.

Further, the terminal device may record the first communications service in a delayed-service table, and disable the preset reminder of the first communications service. Generally, the first preset value may be the same as or different from the second preset value. Preferably, both can take a value close to 0, that is, a speed value of the terminal device that nearly stops is preferably selected. The speed value of the terminal device that nearly stops corresponds to a state in which the user stops, such as a moment of waiting at the red traffic signal and a state in which the user parks. Therefore, the user may securely examine the communications service. The terminal device may obtain the recorded first communications service from the delayed-service table, enable the preset reminder of the first communications service, and correspondingly delete the first communications service. It should be noted that the terminal device may enable the corresponding preset reminder of the first communications service only when the speed of the terminal device decreases to the second preset value for the first time after the preset reminder of the first communications service is disabled. That is, the subsequent operations do not need to be performed if no communications service is received, even when the speed of the terminal device decreases to 0.

Before step 101, the method may further include controlling the terminal device to establish a communication connection to a vehicle. Then, step 101 may further include obtaining the speed of the terminal device by obtaining a vehicle speed of the vehicle. Further, there are many methods for obtaining the vehicle speed of the vehicle at which the terminal device is located, such as, a rotational speed method and a Global Positioning System (GPS) method. The rotational speed method further includes obtaining, by the terminal device, a rotational speed of the vehicle, multiplying the rotational speed by a preset radius of a vehicle wheel, and obtaining the vehicle speed of the vehicle after the vehicle is connected to the terminal device, where the vehicle speed in the present disclosure is the speed of the vehicle. The GPS method may include determining, according to a GPS function embedded in a smartphone, a change in a preset time period and of real-time locations of the vehicle at which the smartphone is located in order to obtain, by means of calculation, the vehicle speed.

Further, when the vehicle has in-vehicle BLUETOOTH and the terminal device also has BLUETOOTH, after the in-vehicle BLUETOOTH of the vehicle is successfully paired with the BLUETOOTH of the terminal device, controlling the terminal device to establish a communication connection to a vehicle includes controlling the terminal device and the vehicle to establish the communication connection using the successfully paired BLUETOOTH.

After step 102, the method further includes that the first communications service belongs to a preset communications service, where the preset communications service is preset according to a choice of the user, or set by the terminal device by default.

It should be noted that the method provided in the present disclosure is not only used in a scenario of vehicle driving, but also used in other scenarios such as yacht driving and exercise.

Embodiment 2

Figure 2A:
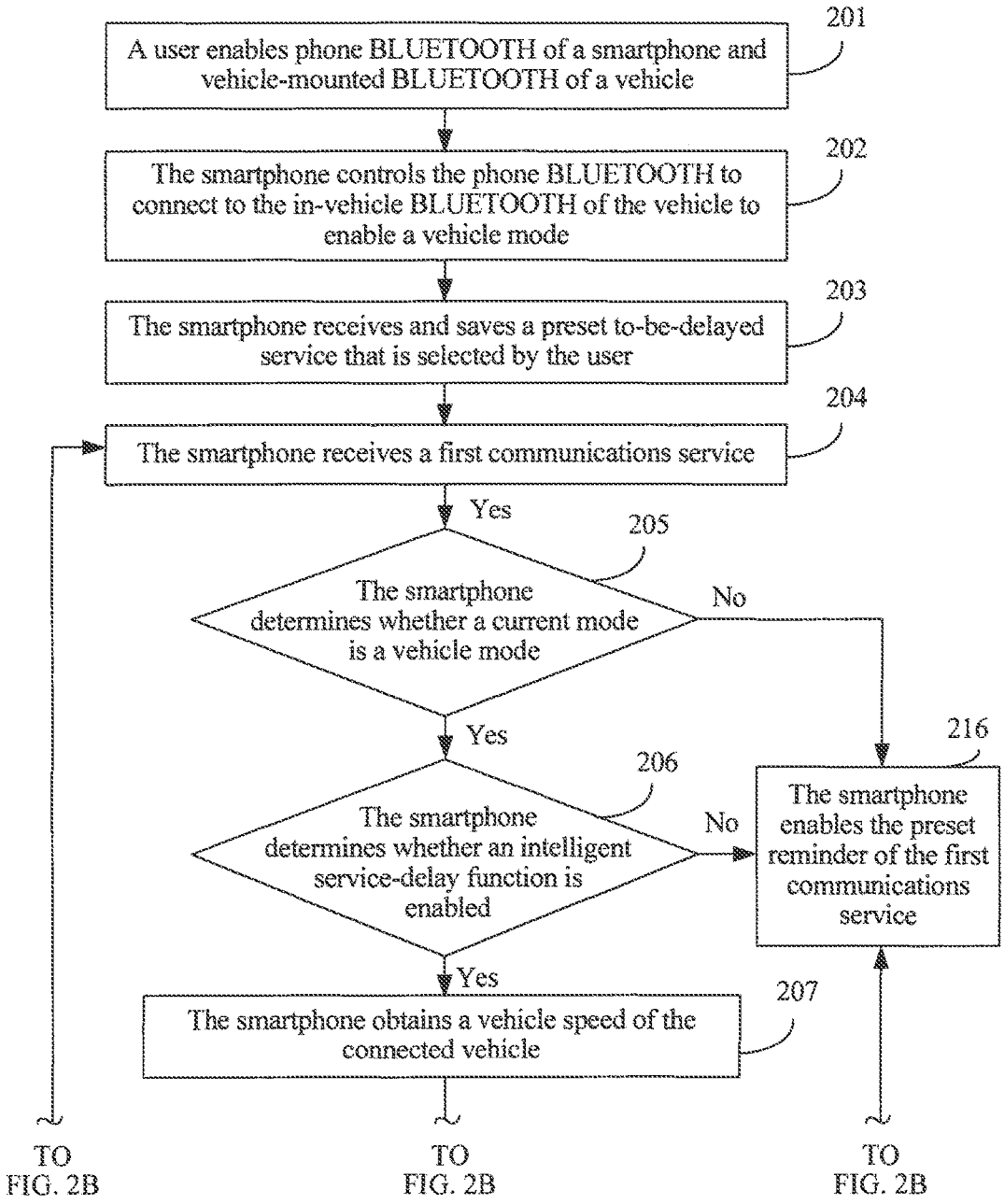
FIG. 2A and FIG. 2B are a flowchart of another data processing method according to an embodiment of the present disclosure.
Figure 2B:
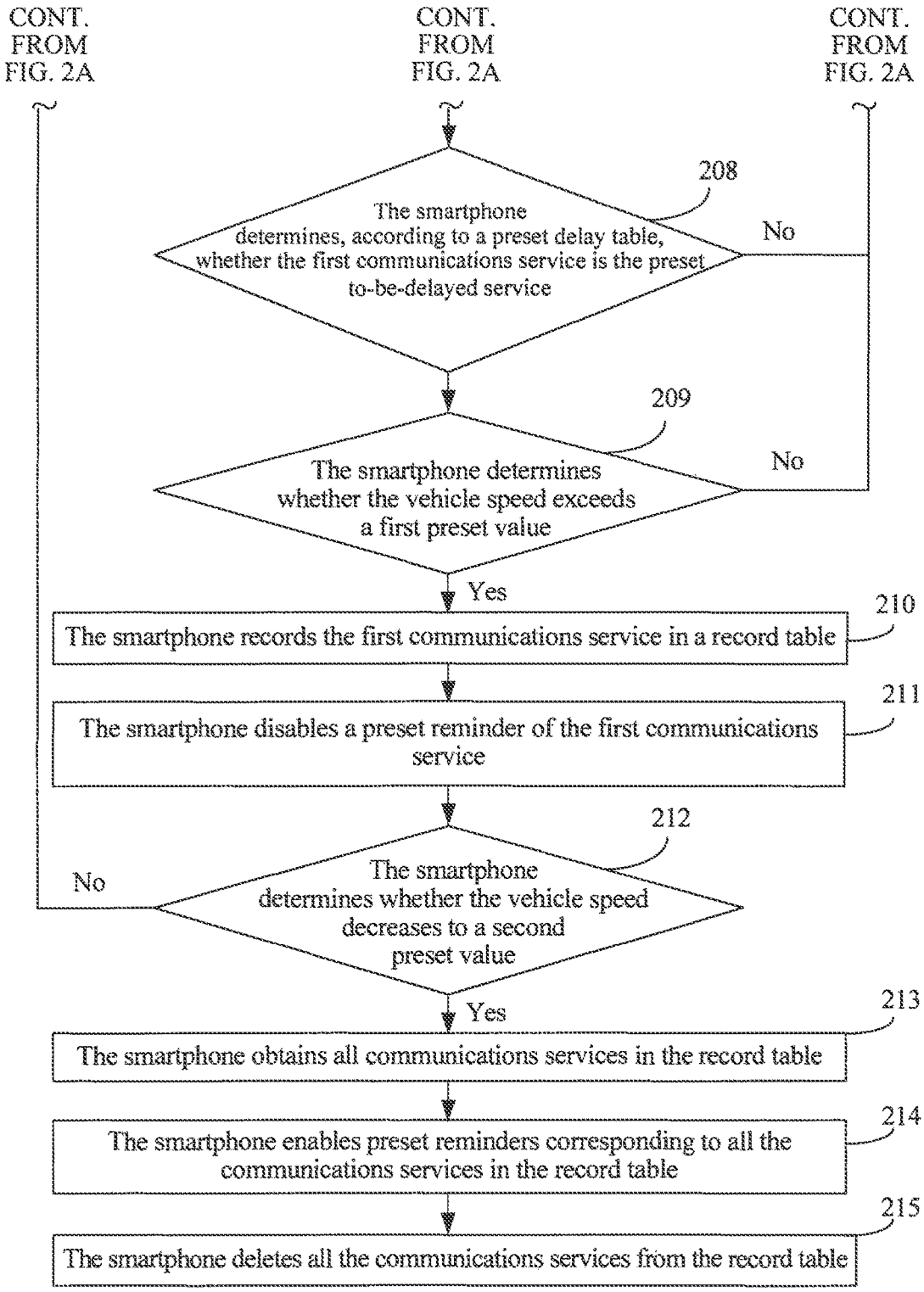

This embodiment of the present disclosure provides a data processing method. It is assumed that the method is applied to a vehicle mode of a smartphone. In other approaches, the vehicle mode may be enabled in two manners, where one manner is a connection between a vehicle and the smartphone, and the other manner, a user taps the smartphone to enable the vehicle mode of the user. This embodiment is described using an example of the connection between the vehicle of the user and the smartphone. It should be noted that for a step similar to or same as that in Embodiment 1, reference may be made to Embodiment 1. As shown in FIG. 2, the data processing method includes the following steps.

Step 201: The user enables phone BLUETOOTH of the smartphone and in-vehicle BLUETOOTH of the vehicle.

Figure 3A:
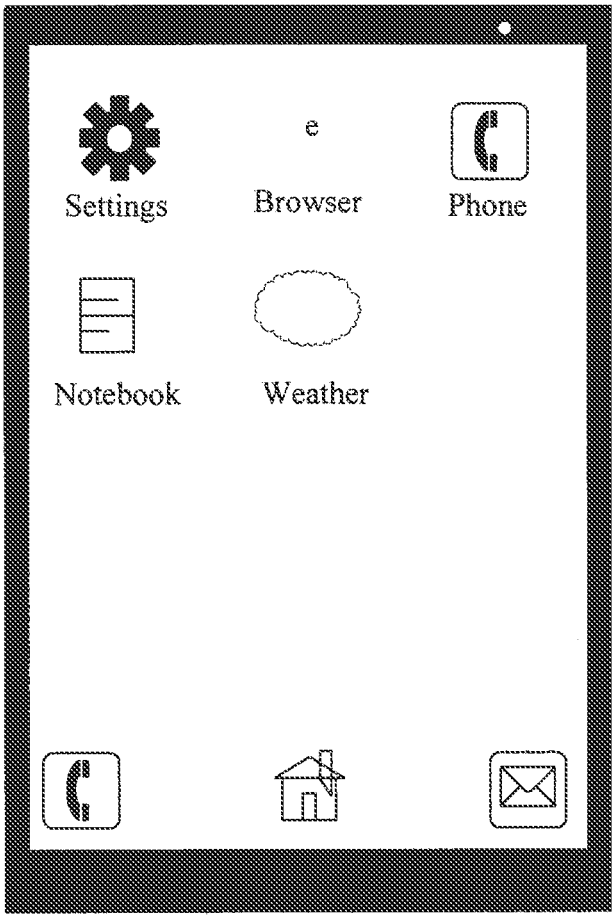
FIGS. 3A and 3B are a user operation interface of a smartphone.
Figure 3B:
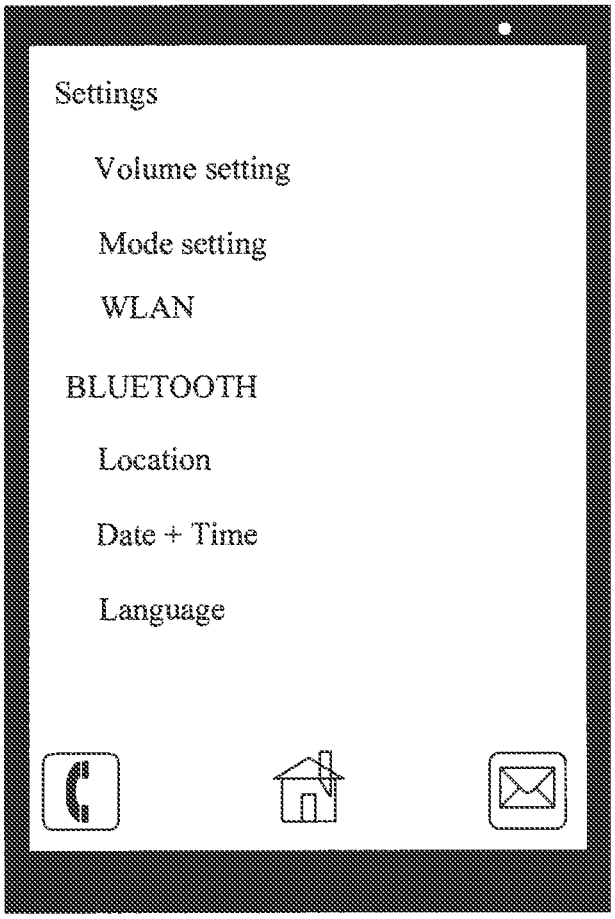

As shown in FIG. 3A, the user taps an option of 'settings' at an interface of the smartphone. As shown in FIG. 3B, after opening the option of 'settings,' the user taps and selects an option of 'BLUETOOTH' to enable the BLUETOOTH, enters the vehicle, and enables the in-vehicle BLUETOOTH, where a specific method is similar to that for enabling the phone BLUETOOTH of the smartphone.

Step 202: The smartphone controls the phone BLUETOOTH to connect to the in-vehicle BLUETOOTH of the vehicle to enable the vehicle mode.

In this case, the in-vehicle BLUETOOTH of the vehicle obtains BLUETOOTH information of another surrounding device that enables BLUETOOTH, where the BLUETOOTH information carries an identifier of user equipment. If pairing is not performed between the BLUETOOTH of the other device that enables the BLUETOOTH and the in-vehicle BLUETOOTH of the vehicle, the user determines a smartphone that needs to be paired. The smartphone sends a pairing request to the vehicle (or the vehicle sends a pairing request to the smartphone), and pairing is performed between the phone BLUETOOTH and the in-vehicle BLUETOOTH. If pairing is successful, the smartphone and the vehicle are connected using the phone BLUETOOTH and the in-vehicle BLUETOOTH, the smartphone saves an identifier of the vehicle, and the vehicle also saves an identifier of the smartphone such that in a next connection, pairing does not need to be performed again between the vehicle and the smartphone. The smartphone and the vehicle are automatically connected if pairing has been performed between phone BLUETOOTH of a smartphone in the other device that enables BLUETOOTH and the in-vehicle BLUETOOTH.

In this case, there is an advantage that this embodiment of the present disclosure is pertinently applied. Further, pairing has generally been performed between a driver and the vehicle. Therefore, this embodiment of the present disclosure may be pertinently applied to the driver. Actually, only the driver needs to be prevented from being disturbed. Because a passenger does not need to drive the vehicle, this embodiment of the present disclosure may be not applied to the passenger.

Step 203: The smartphone receives and saves a preset to-be-delayed service selected by the user.

The user enables an intelligent delay function. The user may select a service that needs to be delayed as the preset to-be-delayed service, or may consider by default a system-set service as the preset to-be-delayed service. In this embodiment, for example, the preset to-be-delayed service is push information of an application. The user taps and enters a user interface for setting the preset to-be-delayed service, and taps and selects an application A, an application B, and an application C according to a usage status of the user, that is, push information corresponding to the selected application A, the selected application B, and the selected application C is to be delayed.

Further, the smartphone receives an identifier of the application corresponding to the push information and saves identifiers of the application A, the application B, and the application C in a preset delay table.

Step 204: The smartphone receives a first communications service.

Step 205: The smartphone determines whether a current mode is the vehicle mode. If the current mode is the vehicle mode, step 206 is performed. If the current mode is not the vehicle mode, step 216 is performed.

Exemplarily, it is assumed that a flag bit of the vehicle mode is set in the smartphone, where 0 indicates that the vehicle mode is not enabled, and 1 indicates that the vehicle mode is enabled. An initial state is 0 by default. The flag bit of the vehicle mode changes from 0 to 1 when the user selects the vehicle mode. Therefore, the smartphone only needs to determine whether the flag bit of the vehicle mode is 1. In this embodiment, a method for determining whether the current mode is the vehicle mode is not limited thereto. It should be noted that in this embodiment, the vehicle mode is enabled when the smartphone and the vehicle control a BLUETOOTH connection, and the vehicle mode is exited if the smartphone and the vehicle are disconnected. Therefore, in this embodiment, whether the current mode is the vehicle mode needs to be determined.

Step 206: The smartphone determines whether an intelligent service-delay function is enabled. If the intelligent service-delay function is enabled, step 207 is performed. If the intelligent service-delay function is not enabled, step 216 is performed.

Similar to the flag bit of the vehicle mode, a flag bit of the intelligent service-delay function is also set in the smartphone. It is assumed that 0 indicates that the intelligent service-delay function is not enabled, and 1 indicates that the intelligent service-delay function is enabled. The smartphone only needs to determine whether the flag bit of the intelligent service-delay function is 1.

Step 207: The smartphone obtains a vehicle speed of the connected vehicle.

When the user enables an intelligent service-delay mode, the smartphone automatically obtains a rotational speed of the vehicle, and multiplies the rotational speed by the radius of the wheel to obtain the vehicle speed. It should be noted that after the intelligent service-delay mode is enabled, the vehicle speed is obtained in real time.

Step 208: The smartphone determines, according to a preset delay table, whether the first communications service is the preset to-be-delayed service. If the first communications service is the preset to-be-delayed service, step 209 is performed. If the first communications service is not the preset to-be-delayed service, step 216 is performed.

Further, the smartphone may determine whether the identifier that is of the application and included in the push information is the identifier that is of the application A, the application B, or the application C and in the preset delay table. If the identifier is the identifier that is of the application A, the application B, or the application C and in the preset delay table, it indicates that the push information is the preset to-be-delayed service, and step 210 is performed. If the identifier is not the identifier that is of the application A, the application B, or the application C and in the preset delay table, it indicates that the push information is not the preset to-be-delayed service, and step 216 is performed.

Step 209: The smartphone determines whether the vehicle speed exceeds a first preset value. If the vehicle speed exceeds the first preset value, step 210 is performed. If the vehicle speed does not exceed the first preset value, step 216 is performed.

It is assumed that when the first communications service is the push information of the application A, the application B, or the application C, step 209 is performed.

Step 210: The smartphone records the first communications service in a record table, step 211 is performed.

Further, it is assumed that a preset vehicle speed is 0. A flag bit of the vehicle speed is 0 when the vehicle speed decreases to 0. A flag bit of the vehicle speed is 1 when the vehicle speed exceeds 0. The flag bit of the vehicle speed is a rising edge, and a corresponding operation update function is triggered when the flag bit of the vehicle speed changes from 0 to 1. The operation update function saves the push information in the record table, and the record table is a delayed-service table that may be used to record the push information. The smartphone only needs to determine whether the flag bit of the vehicle speed is 0. In this embodiment, a method for determining whether the vehicle speed is 0 is not limited thereto.

Step 211: The smartphone disables a preset reminder of the first communications service.

Step 212: The smartphone determines whether the vehicle speed decreases to a second preset value. If the vehicle speed decreases to the second preset value, step 213 is performed. If the vehicle speed does not decrease to the second preset value, waiting is needed and step 204 is performed.

If the smartphone does not receive the communications service, step 212 to step 216 do not need to be performed.

Step 213: The smartphone obtains all communications services in the record table.

Further, it is assumed that a value of a preset vehicle speed is 0. The flag bit of the vehicle speed is 0 when the vehicle speed decreases to 0, and the flag bit of the vehicle speed is 1 when the vehicle speed exceeds 0. The flag bit of the vehicle speed is a falling edge, and a corresponding update stop function is triggered when the flag bit of the vehicle speed changes from 1 to 0. The update stop function takes out all the communications services that are saved in a record (a registration table), and make the communications services work again.

Step 214: The smartphone enables preset reminders corresponding to all the communications services in the record table.

Step 215: The smartphone deletes all the communications services from the record table.

It should be specially noted that when the user disables an intelligent message-delay function of the vehicle mode, the smartphone may enable the preset reminders corresponding to all the communications services in the record table.

Step 216: The smartphone enables the preset reminder of the first communications service.

In this case, when a vehicle speed of a vehicle at which a terminal device is located exceeds a first preset value, a preset reminder of a communications service is delayed. The previously delayed preset reminder of the communications serve is enabled when the vehicle speed decreases to a second preset value. In this way, a user hears or sees the preset reminder of the communications service only when the vehicle speed is less than the second preset value, and then examines the communications service. Therefore, a security threat in a process of driving a vehicle by a user is greatly reduced.

Embodiment 3

Figure 4:
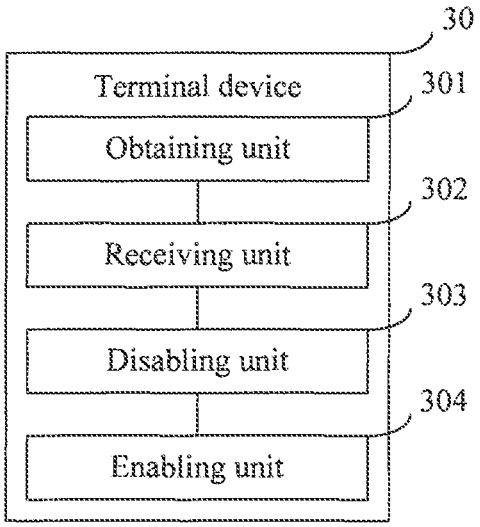
FIG. 4 is a schematic structural diagram of a terminal device according to an embodiment of the present disclosure.

This embodiment of the present disclosure provides a terminal device. As shown in FIG. 4, the terminal device 30 may include an obtaining unit 301 configured to obtain a speed of the terminal device 30, a receiving unit 302 configured to receive a first communications service, a disabling unit 303 configured to disable a preset reminder of the first communications service that is received by the receiving unit 302 if the speed of the terminal device 30 obtained by the obtaining unit 301 exceeds a first preset value, and an enabling unit 304 configured to enable the preset reminder of the first communications service received by the receiving unit 302 if the speed of the terminal device 30 obtained by the obtaining unit 301 decreases to a second preset value, where the second preset value is less than or equal to the first preset value.

In this case, when a speed of the terminal device 30 exceeds a first preset value, a preset reminder of a first communications service is disabled, that is, the preset reminder of the first communications service is delayed. The preset reminder of the first communications service is not enabled until the speed of the terminal device 30 decreases to a second preset value. Therefore, when the speed of the terminal device 30 is the first preset value, a user is prevented from being disturbed by the first communications service received by the terminal device 30.

Figure 5:
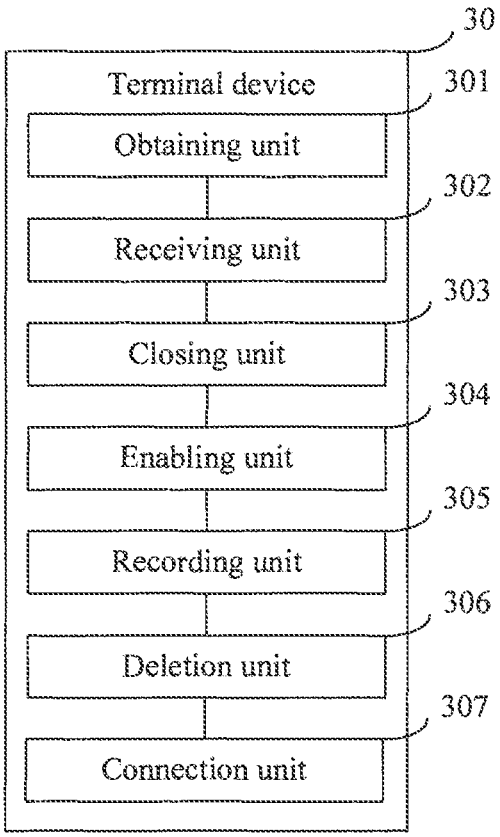
FIG. 5 is a schematic structural diagram of another terminal device according to an embodiment of the present disclosure.

Further, as shown in FIG. 5, the terminal device 30 further includes a recording unit 305 configured to record the first communications service.

The enabling unit 304 is further configured to obtain the recorded first communications service, and enable the corresponding preset reminder according to the recorded first communications service.

As shown in FIG. 5, with respect to the terminal device 30 shown in FIG. 4, the terminal device 30 further includes a deletion unit 306 configured to delete the first communications service.

The terminal device 30 further includes a connection unit 307 configured to control the terminal device 30 to establish a communication connection to a vehicle.

Correspondingly, the obtaining unit 301 is further configured obtain the speed of the terminal device 30 by obtaining a vehicle speed of the vehicle.

Further, the vehicle has in-vehicle BLUETOOTH, and the terminal device 30 also has BLUETOOTH.

After the in-vehicle BLUETOOTH of the vehicle is successfully paired with the BLUETOOTH of the terminal device, the connection unit 307 is further configured to control the terminal device 30 and the vehicle to establish a communication connection using the successfully paired BLUETOOTH.

Further, the first communications service belongs to a preset communications service, where the preset communications service is preset according to a choice of a user, or set by the terminal device by default.

Embodiment 4

Figure 6:
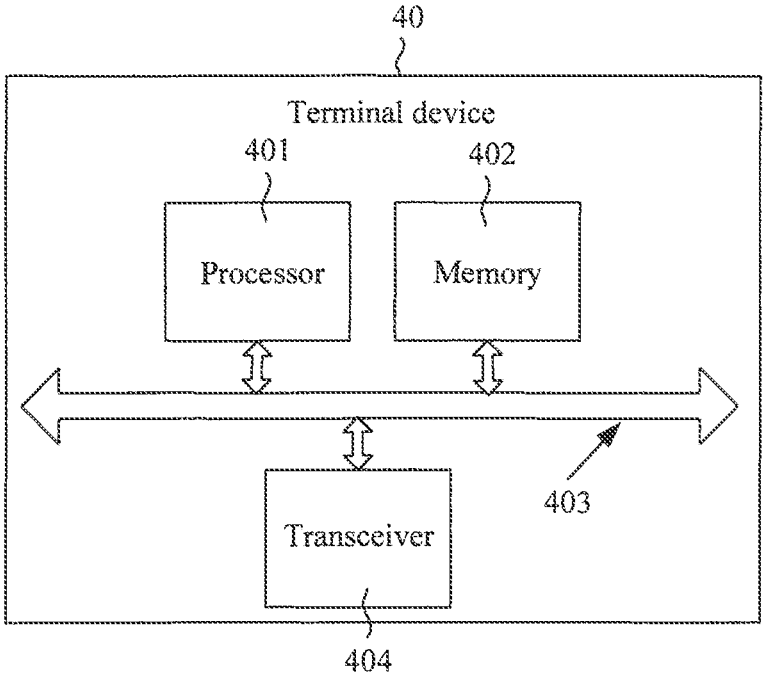
FIG. 6 is a schematic structural diagram of still another terminal device according to an embodiment of the present disclosure.

FIG. 6 is a schematic structural diagram of still another terminal device 40 according to an embodiment of the present disclosure. The terminal device 40 may include a memory 402, a processor 401 that is coupled with the memory 402, a transceiver 404, and one or a combination of communications buses 403 that are used to connect devices in the terminal device 40 and used to implement a connection and a mutual communication between the devices.

The communications bus 403 may be an Industry Standard Architecture (ISA) bus, a Peripheral Component Interconnect (PCI) bus, an Extended Industry Standard Architecture (EISA) bus, or the like. The bus 403 may be categorized into an address bus, a data bus, a control bus, and the like.

The transceiver 404 is configured to communicate with an external communications device.

The memory 402 may include a read-only memory (ROM) and a random access memory (RAM) and is configured to store program code.

The processor 401 is configured to be used to invoke the program code stored in the memory 402 to perform the steps of obtaining a speed of the terminal device 40, receiving a first communications service, disabling a preset reminder of the first communications service if the speed of the terminal device 40 exceeds a first preset value, or enabling the preset reminder of the first communications service if the speed of the terminal device 40 decreases to a second preset value, where the second preset value is less than or equal to the first preset value.

In this case, when a speed of the terminal device 40 exceeds a first preset value, a preset reminder of a first communications service is disabled, that is, the preset reminder of the first communications service is delayed. The preset reminder of the first communications service is not enabled until the speed of the terminal device 40 decreases to a second preset value. Therefore, when the speed of the terminal device 40 is the first preset value, a user is prevented from being disturbed by the first communications service received by the terminal device 40.

The processor 401 is further configured to perform the step of recording the first communications service.

The enabling the preset reminder of the first communications service if the speed of the terminal device 40 decreases to the second preset value includes obtaining the recorded first communications service, and enabling the corresponding preset reminder according to the recorded first communications service.

The processor 401 is further configured to perform the step of deleting the first communications service.

The processor 401 is further configured to perform the steps of controlling the terminal device 40 to establish a communication connection to a vehicle, and obtaining the speed of the terminal device 40 by obtaining a vehicle speed of the vehicle.

Figure 7:
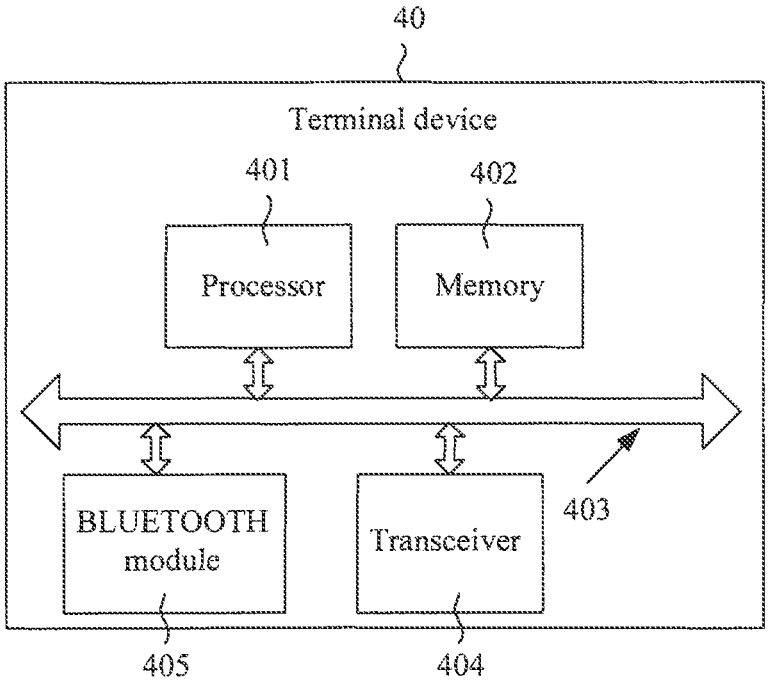
FIG. 7 is a schematic structural diagram of yet another terminal device according to an embodiment of the present disclosure.

As shown in FIG. 7, the terminal device 40 further includes a BLUETOOTH module 405 configured to communicate with a BLUETOOTH communication device.

It should be noted that the BLUETOOTH module 405 may further be a part of the transceiver 404.

Further, the vehicle has in-vehicle BLUETOOTH, and the terminal device 40 also has BLUETOOTH. The controlling the terminal device 40 to establish a communication connection to a vehicle includes controlling the terminal device 40 and the vehicle to establish a communication connection after the in-vehicle BLUETOOTH of the vehicle is successfully paired with the BLUETOOTH of the terminal device 40, and using the successfully paired BLUETOOTH.

Further, the first communications service belongs to a preset communications service, where the preset communications service is preset according to a choice of a user, or set by the terminal device 40 by default.

It should be noted that apparatus embodiments provided in the embodiments of the present disclosure are all used to implement the foregoing method embodiments. For a related operating principle and operating process, reference may be made to the method embodiments, and a similar description is not described herein again.

It should be noted that a sequence of the steps of the data processing method provided in the embodiments of the present disclosure may be properly adjusted, and the steps may also be correspondingly added or deleted according to a situation. Any variation readily figured out by persons skilled in the art within the technical scope disclosed in the present disclosure shall fall within the protection scope of the present disclosure, and details are not described herein again.

The foregoing descriptions are merely specific embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A data processing method for a terminal device, comprising:

associating one or more applications with a to-be-delayed service[using one or more identifiers of the one or more applications];

determining whether a current mode of the terminal device is a vehicle mode[based on a setting of a first flag bit in the terminal device];

determining whether an intelligent service-delay function is enabled[based on a second flag bit];

obtaining, by the terminal device, a speed of the terminal device when the current mode of the terminal device is the vehicle mode and the intelligent service-delay function is enabled;

receiving, by the terminal device, a first communications service;

determining whether [notification information associated with] the first communications service [includes at least one of the one or more identifiers;] *is associated with the to-be-delayed service; and* disabling, by the terminal device, a preset reminder of the first communications service *when the intelligent service-delay function is enabled,* when the speed of the terminal device is greater than a first preset value, and when [the notification information associated with] the first communications service [includes the at least one of the one or more identifiers; and after the preset reminder of the first communications service is disabled, enabling, by the terminal device, the preset reminder of the first communications service when the speed of the terminal device is less than or equal to a second preset value, wherein the second preset value is less than or equal to the first preset value] *is associated with the to-be-delayed service*.

2. The data processing method according to claim 1, wherein before enabling the preset reminder of the first communications service, the *data processing* method further comprises recording, by the terminal device, the first communications service, and wherein enabling the preset reminder of the first communications service comprises:

obtaining the recorded first communications service; and enabling a corresponding preset reminder according to the recorded first communications service.

3. The data processing method according to claim 2, wherein after enabling the preset reminder of the first communications service, the *data processing* method further comprises deleting, by the terminal device, the first communications service.

4. The data processing method according to claim 1, wherein before obtaining the speed of the terminal device, the *data processing* method further comprises controlling the terminal device to establish a communication connection to a vehicle, wherein obtaining the speed of the terminal device comprises obtaining the speed of the terminal device by obtaining a speed of the vehicle, and wherein the vehicle mode is enabled when the terminal device establishes the communication connection to the vehicle.

[5. The data processing method according to claim 4, wherein the terminal device comprises BLUETOOTH and wherein after in-vehicle BLUETOOTH of the vehicle is successfully paired with a BLUETOOTH of the terminal device, controlling the terminal device to establish the communication connection to the vehicle comprises controlling the terminal device to establish the communication connection using the successfully paired BLUETOOTH.]

6. The data processing method according to claim 1, wherein the first communications service belongs to a preset communications service, and wherein the preset communications service is preset according to a choice of a user.

7. A terminal device, comprising:

a memory configured to store a data structure that associates one or more applications of the terminal device with a to-be-delayed service[using one or more identifiers of the one or more applications]; and a processor coupled to the memory and configured to:

determine whether a current mode of the terminal device is a vehicle mode[based on a setting of a first flag bit in the terminal device];

determine whether an intelligent service-delay function is enabled[based on a second flag bit];

obtain a speed of the terminal device when the current mode of the terminal device is the vehicle mode and the intelligent service-delay function is enabled;

receive a first communications service;

determine whether [notification information associated with] the first communications service [includes at least one of the one or more identifiers;] *is associated with the to-be-delayed service; and* disable a preset reminder of the first communications service *when the intelligent service-delay function is enabled,* when the speed of the terminal device is greater than a first preset value, and when [the notification information associated with] the first communications service [includes the at least one of the one or more identifiers; and after the preset reminder of the first communications service is disabled, enable the preset reminder of the first communications service when the speed of the terminal device is less than or equal to a second preset value, wherein the second preset value is less than or equal to the first preset value] *is associated with the to-be-delayed service.*

8. The terminal device according to claim 7, wherein the processor is further configured to:

record the first communications service;

obtain the recorded first communications service; and enable a corresponding preset reminder according to the recorded first communications service.

9. The terminal device according to claim 8, wherein the processor is further configured to delete the first communications service.

10. The terminal device according to claim 7, wherein the processor is further configured to:

control the terminal device to establish a communication connection to a vehicle; and obtain the speed of the terminal device by obtaining a speed of the vehicle, wherein the vehicle mode is enabled when the communication connection between the terminal device and the vehicle is established.

[11. The terminal device according to claim 10, wherein the terminal device comprises BLUETOOTH, and wherein after in-vehicle BLUETOOTH of the vehicle is successfully paired with a BLUETOOTH of the terminal device, the processor is further configured to control the terminal device and the vehicle to establish the communication connection using the successfully paired BLUETOOTH.]

12. The terminal device according to claim 7, wherein the first communications service belongs to a preset communications service, and wherein the preset communications service is preset according to a choice of a user.

13. A terminal device, comprising[:]:

a transceiver configured to communicate with an external communications device;

memory configured to store program code and a data structure that associates one or more applications of the terminal device with a to-be-delayed service[using one or more identifiers of the one or more applications]; and a processor coupled to the memory and to the transceiver, wherein the processor is configured to invoke the program code stored in the memory to cause the terminal device to:

determine whether a current mode of the terminal device is a vehicle mode[based on a setting of a first flag bit in the terminal device];

determine whether an intelligent service-delay function is enabled[based on a second flag bit];

obtain a speed of the terminal device when the current mode of the terminal device is the vehicle mode and the intelligent service-delay function is enabled;

receive a first communications service;

determine whether [notification information associated with] the first communications service [includes at least one of the one or more identifiers in the data structure stored in the memory;] *is associated with the to-be-delayed service; and* disable a preset reminder of the first communications service *when the intelligent service-delay function is enabled,* when the speed of the terminal device is greater than a first preset value, and when [the notification information associated with] the first communications service [includes the at least one of the one or more identifiers; and after the preset reminder of the first communications service is disabled, enable the preset reminder of the first communications service when the speed of the terminal device is less than or equal to a second preset value, wherein the second preset value is less than or equal to the first preset value] *is associated with the to-be-delayed service.*

14. The terminal device according to claim 13, wherein the processor is further configured to:

record the first communications service before enabling the preset reminder of the first communications service;

obtain the recorded first communications service; and enable a corresponding preset reminder according to the recorded first communications service.

15. The terminal device according to claim 14, wherein the processor is further configured to delete the first communications service after enabling the preset reminder of the first communications service.

16. The terminal device according to claim 13, wherein the processor is further configured to:

control the terminal device to establish a communication connection to a vehicle; and obtain the speed of the terminal device by obtaining a speed of the vehicle, wherein the vehicle mode is enabled when the communication connection between the terminal device and the vehicle is established.

[17. The terminal device according to claim 16, wherein the processor is further configured to communicate with a BLUETOOTH communication device, and wherein after in-vehicle BLUETOOTH of the vehicle is successfully paired with a BLUETOOTH of the terminal device to control the terminal device to establish the communication connection using the successfully paired BLUETOOTH.]

18. The terminal device according to claim 13, wherein the first communications service belongs to a preset communications service, and wherein the preset communications service is preset according to a choice of a user or set by the terminal device by default.

19. The data processing method according to claim 1, wherein the first communications service belongs to a preset communications service, and wherein the preset communications service is set by the terminal device by default.

20. The terminal device according to claim 7, wherein the to-be-delayed service corresponds to a push service.

*21. The data processing method according to claim 1, wherein after the preset reminder of the first communications service is disabled, the data processing method further comprises enabling, by the terminal device, the preset reminder of the first communications service when the speed of the terminal device is less than or equal to a second preset value, and wherein the second preset value is less than or equal to the first preset value.*

*22. The terminal device according to claim 7, wherein after the preset reminder of the first communications service is disabled, enable the preset reminder of the first communications service when the speed of the terminal device is less than or equal to a second preset value, and wherein the second preset value is less than or equal to the first preset value.*

*23. The terminal device according to claim 13, wherein after the preset reminder of the first communications service is disabled, the processor is further configured to enable the preset reminder of the first communications service when the speed of the terminal device is less than or equal to a second preset value, and wherein the second preset value is less than or equal to the first preset value.*

* * * * *